(12) United States Patent
Cobb et al.

(10) Patent No.: US 9,444,260 B2
(45) Date of Patent: Sep. 13, 2016

(54) ENERGY MANAGEMENT SYSTEM AND METHOD FOR CONTROLLING HIGH CURRENT DRAWS FROM VARIABLE CURRENT DEVICES COMMONLY CONNECTABLE TO AN ELECTRICAL CIRCUIT

(71) Applicants: Robert Cobb, St. Charles, MO (US); Joseph Webster, St. Charles, MO (US)

(72) Inventors: Robert Cobb, St. Charles, MO (US); Joseph Webster, St. Charles, MO (US)

(73) Assignee: Newco Enterprises, Inc., St. Charles, MO (US)

( * ) Notice: Subject to any disclaimer, the term of this patent is extended or adjusted under 35 U.S.C. 154(b) by 766 days.

(21) Appl. No.: 13/815,189

(22) Filed: Feb. 7, 2013

(65) Prior Publication Data

US 2013/0200706 A1    Aug. 8, 2013

Related U.S. Application Data

(60) Provisional application No. 61/633,229, filed on Feb. 7, 2012.

(51) Int. Cl.
*H02J 1/00*       (2006.01)
*H02J 4/00*       (2006.01)
*H02J 3/14*       (2006.01)

(52) U.S. Cl.
CPC .. *H02J 4/00* (2013.01); *H02J 3/14* (2013.01); *H02J 2003/143* (2013.01); *Y02B 70/3225* (2013.01); *Y02B 70/3266* (2013.01); *Y04S 20/222* (2013.01); *Y04S 20/242* (2013.01); *Y10T 307/438* (2015.04)

(58) Field of Classification Search
CPC .............................. H02J 3/14; H02J 2003/143
USPC .......................................................... 307/31
See application file for complete search history.

(56) References Cited

U.S. PATENT DOCUMENTS

| | | | | |
|---|---|---|---|---|
| 4,502,842 A * | 3/1985 | Currier | .................. | F04B 41/06 417/53 |
| 5,343,384 A * | 8/1994 | Fisher | .................. | F04B 49/022 417/8 |
| 5,408,917 A * | 4/1995 | Lussi | .................... | A47J 31/007 219/428 |
| 5,515,267 A * | 5/1996 | Alsenz | ................. | F25B 49/005 700/83 |
| 6,772,599 B2 * | 8/2004 | Bodell, II | ......... | F04D 27/0253 62/129 |
| 2012/0171955 A1 * | 7/2012 | Drake | ............... | H04W 52/0216 455/41.2 |

FOREIGN PATENT DOCUMENTS

WO      WO 9934160 A1 *  7/1999   ............ F25B 49/022

* cited by examiner

*Primary Examiner* — Jared Fureman
*Assistant Examiner* — Alfonso Perez Borroto
(74) *Attorney, Agent, or Firm* — Paul M Denk

(57) ABSTRACT

An energy management controller for controlling and limiting the time during which high current draws may be made by one or more of a plurality of single serve coffee brewers that are commonly connected to the same circuit and which include heater constructions that require and draw high power at certain times during operation, and require and draw lower power at other times. It includes one controller board, connected to the primary brewer to complete a circuit, and which board includes heat and wait timer functions to monitor the power status usage with respect to all of the brewers.

30 Claims, 8 Drawing Sheets

| CONTROLLER CARD A | | | | | | | |
|---|---|---|---|---|---|---|---|
| STATE | CONTROLLER CARD A TIMERS STATUS | | I/O POWER STATUS INPUTS | | | POWER CONNECTION ALLOWED | A PWR OUTPUT STATUS |
| | $HT_A$ | $WT_A$ | B PWR | C PWR | D PWR | | |
| S0 | EXPIRED | EXPIRED | 0% | 0% | 0% | NO | 0% |
| S1 | TIMING | EXPIRED | 0% | 0% | 0% | YES | 100% |
| S2 | EXPIRED | TIMING | 0% | 0% | 0% | NO | 0% |
| S3 | EXPIRED | TIMING | 100% | 0% | 0% | NO | 0% |
| S4 | EXPIRED | TIMING | 0% | 100% | 0% | NO | 0% |
| S5 | EXPIRED | TIMING | 0% | 0% | 100% | NO | 0% |

| A (PRIMARY) BREWER CONTROLLER CARD ||||||
| --- | --- | --- | --- | --- | --- |
| A (PRIMARY) BREWER TIMERS STATUS || A (PRIMARY) BREWER POWER STATUS (@I/O) ||| |
| STATE | A HEAT TIMER STATUS | A WAIT TIMER STATUS | B HEAT TIMER STATUS | C HEAT TIMER STATUS | D HEAT TIMER STATUS | BREWER ENABLED |
| S0 | EXPIRED (POWER STATUS @0%) | EXPIRED | EXPIRED (0%) | EXPIRED (0%) | EXPIRED (0%) | NO BREWERS ENABLED |
| S1 | TIMING (POWER STATUS @100%) | EXPIRED | EXPIRED (0%) | EXPIRED (0%) | EXPIRED (0%) | BREWER A ENABLED |
| S2 | EXPIRED (POWER STATUS @0%) | TIMING | EXPIRED (0%) | EXPIRED (0%) | EXPIRED (0%) | NO BREWERS ENABLED |
| S3 | EXPIRED (POWER STATUS @0%) | TIMING | TIMING (100%) | EXPIRED (0%) | EXPIRED (0%) | BREWER B ENABLED |
| S4 | EXPIRED (POWER STATUS @0%) | TIMING | EXPIRED (0%) | TIMING (100%) | EXPIRED (0%) | BREWER C ENABLED |
| S5 | EXPIRED (POWER STATUS @0%) | TIMING | EXPIRED (0%) | EXPIRED (0%) | TIMING (100%) | BREWER D ENABLED |

ENERGY MANAGEMENT SYSTEM AND METHOD FOR CONTROLLING HIGH CURRENT DRAWS FROM VARIABLE CURRENT DEVICES COMMONLY CONNECTABLE TO AN ELECTRICAL CIRCUIT

CROSS REFERENCE TO RELATED APPLICATION

This non-provisional patent application claims priority to the provisional patent application having Ser. No. 61/633,229, filed on Feb. 7, 2012.

FIELD OF THE INVENTION

The present invention relates generally to an energy management controller or system for controlling high current draws by one or more of a plurality of devices commonly connected to the same electrical circuit in order to avoid tripping the circuit's circuit breaker when multiple of such devices might otherwise seek to draw high currents at the same time, and a method of use thereof. Such energy management controller or system is particularly applicable to a plurality of single serve beverage brewers commonly connected to the same 15 amp circuit, particularly when such brewers have operating cycles that have high power demands during one portion of their cycles and lower power demands during other portions of their cycles.

BACKGROUND OF THE INVENTION

Over the years, it has become a common practice to connect to a single electrical circuit a number of different devices to be powered thereby. While circuits designed and wired for heavier loads, including heating, cooling, heavy machine usage, and other devices or systems are common, for safety and other reasons most circuits intended for general everyday use in residences and businesses are designed and wired for lesser loading. All of such electrical circuits are typically protected by fuses or circuit breakers or other devices or systems, hereinafter referred to generically as circuit breakers, that limit to a specified amount the amount of current that can be drawn by all of the connected devices as they are operating. Most of the circuits intended for general use in residences and businesses are protected by 15 or 20 amp circuit breakers that trip when the current draw exceeds the specified value.

Typically, residents and businesses will connect to any given circuit a plurality of devices that, operating together, do not draw excessive current as they operate. However, some household or business devices may be such that they have highly variable current draws during their operation, including especially a number of beverage, including coffee, brewers, increasing the possibility, if not the likelihood, that excessive current draws may occasionally be attempted when a brewer attempts to operate during a high power portion of its operation.

Many such coffee brewers have high power demands for a limited portion of their operation, and much lower power demands for other portions of their operation. Typically, at the beginning of a brewing cycle a coffee brewer may require high power, such as 1200-1700 watts (10-14.5 amps) of power, to facilitate heating water in a tank heater as fast as possible, while the power required at other times may be much lower. Typically, the current draw required during the lower power portions of such brew cycles totals only about 0.5-1.5 amps for demands related to brewer controls, brewer displays, water fill components, and, possibly, a low wattage warmer element.

Coffee brewers typically may include a brewer control board that is connectable to an electrical circuit and which, when so connected, more or less continuously draws a low current in order to operably monitor and control the brewer's operation, including determining when to effect the rapid heating of water in the water tank. In general, such control boards are also designed to effect high current draws required for water heating for limited periods near the beginnings of the brewers' operating cycles and by sensing temperature to control when to turn such heating on and off.

If the total current draw on a given 15 amp electrical circuit to which a coffee brewer is connected exceeds 15 amps at any time during the operational cycle of the connected brewer, the circuit breaker for such circuit will trip, thereby depriving not only such connected brewer on that electrical circuit, but also other devices on such electrical circuit, of the electrical power that they require to operate. Such a result is at least annoying to users, requiring resetting of the circuit breaker and, perhaps, staged use and/or operation of the various devices connected to such electrical circuit, and may be injurious to certain devices and troubling to users.

Some users, especially users who may find their access to available electrical circuits limited and/or who wish to employ devices that experience only occasional high current draws, with most power requirements for such devices being at a much lower level, may connect multiple devices, including several devices with occasional high current draws, to the same circuit, but manually and judiciously monitor devices that are actively drawing current at given times to try to ensure that the total current draw remains below the specified circuit breaker rating. In such regard, a user who has a toaster and a coffee brewer connected to the same circuit may ensure that he/she does not attempt to use the toaster during the water tank heating portion of a coffee brewer operation. Invariably, however, some user will occasionally neglect proper monitoring, and the attempted uses of such devices at the same time will result in excessive current draw.

Such situations are often further exacerbated in business or corporate environments where there may be a need for multiple coffee brewers, and attempts may be made to include several brewers on the same electrical circuit. If all the brewers are operating in low power portions of their operation, the total current draw my be within the circuit rating, even if there are additional electrical devices connected to such circuit. Dependent upon a number of variables, including the exact current draw of a particular coffee brewer during its high power portion of operation, the total current draw on the given electrical circuit may still remain within circuit ratings, but if any other device, including a second coffee brewer connected to the same circuit, attempts to operate in a high power mode at the same time, it is probable that an excessive current draw situation will transpire and that the circuit breaker will trip.

Consequently, the connection to a common circuit of multiple devices that have occasional high current draws during their operational cycles has remained problematic.

SUMMARY OF THE INVENTION

The present invention is directed to an energy management controller or system for controlling high current draws by one or more of a plurality of devices, such as single serve coffee brewers, commonly connected to the same electrical circuit in order to avoid tripping the circuit's circuit breaker when multiple of such devices might otherwise seek to draw high currents at the same time, and a method of use of such controller or system.

In general, a single serve coffee brewer includes a control board that operates to control the application of high current to a heater or like element thereof under certain conditions. The present invention comprises a controller installable or installed in circuit with the control board or to be included within a control circuit for the application of high current to the heater of the brewer. The controller may take different forms, dependent upon the particular form of the brewer or other electrical device with which it is to be utilized and upon whether the controller, or any portion thereof, is to be included within the high current circuit or is intended to be included only within a control circuit under control of the device controller board.

In one form of the invention, the controller may thus take the form of an energy management system (EMS) controller board or construction that is interposed between one or more coffee brewers and the electrical circuit to which such brewers are commonly connected, which controller board or construction is operably responsive to monitored information regarding the current draws of such brewers to either allow or interrupt active connection of the coffee brewer control board of a given brewer to the given electrical circuit.

In another form of the invention, particularly intended for use with brewers of the type that employ within the brewer a high power gating construction to control the application of high current to a heater element of the brewer, the operation of which high power gating construction is controlled by a brewer control board operating at low power, the controller may take the form of an energy management system (EMS) controller board or construction that is installed in circuit in the gating control portion of the high power gating construction for one or more of the commonly connected brewers. A significant advantage of this latter form of the invention is that the controller board need not be disposed within the high current circuit for the heater but can be maintained within a low power circuit.

Especially when multiple single serve coffee brewers are commonly connected to a given electrical circuit, the controller system may include for each controlled coffee brewer a separate and discrete controller card or construction therefor, with such controller card having an input/output portion for data exchange, with data input connections operatively connected to receive from other of such single serve coffee brewers on the same electrical circuit, or from controller cards associated with such other single serve coffee brewers, status information regarding such other brewers' then-current power requirements. Such status information may be obtained or derived from the controller cards or constructions associated with such other single serve coffee brewers and/or the control boards of such other single serve coffee brewers. Power monitoring and/or power usage status circuitry can be provided with each controller card or construction for actually measuring power draw and/or for otherwise determining the power usage status for such electrical circuit and/or the devices commonly connected thereto. Alternatively, a derived power draw for a connected brewer may be determined from the status of such brewer's control board. Such power status information can be readily shared or networked by and among components, either by wired or wireless communication, including via BLUETOOTH technology or other wireless technology.

In some of the currently preferred embodiments, the energy management controller cards or constructions may be so designed and configured to determine and/or control when to permit power to be applied to a given associated coffee brewer and its brewer control board. The controller cards may thus include or employ therewith arbitration constructions or techniques of various designs and configurations for such purposes. Such arbitration constructions and techniques may typically determine the priority or order in accordance with which high current will be authorized for and provided to the associated primary brewer and how control thereover will be exercised, especially if multiple commonly connected brewers are seeking or require high current for the operation of their heater elements.

In one current embodiment, the arbitration construction includes two control features, one designated as a high power determination portion for the high power draw portion of such given brewer's operation and the other designated as a wait timing function, the purpose of which is to provide an opportunity for other commonly connected brewers to also effect high power water heating portions of their operation cycles without encountering conflicts with the high power demands of such given brewer. In simpler constructions, the high power determination portion may take the form of a heat timer for the high power water heating portion of such given brewer's operation and the wait timing function may take the form of a wait timer. Such timer features and the control thereof may be affected by a variety of constructions and techniques, including by hard wired circuitry utilizing discrete components as well as by the utilization of programmed logic arrays or simple, programmed microprocessors or the like.

In general, the energy management controller card or construction for a given associated brewer, designated as the primary brewer of such controller card, is so designed to detect whether other commonly connected coffee brewers are then seeking and/or drawing high currents and/or whether a wait time period for such primary brewer has expired, and whether, consistent with such determinations, to permit or interrupt the application of high power to the heater element of such primary brewer. With one preferred embodiment, if the heat timer associated with any other connected brewer has not timed out or the wait timer for the primary brewer has not yet timed out, the controller card prevents the application of power to the control board of the primary brewer. On the other hand, if the heat timers associated with the other connected brewers have all timed out and the wait timer for the primary brewer has also timed out, the controller card permits application of power to the control card of the primary brewer and starts the heat timer associated with such primary brewer.

During the time that the heat timer associated with the primary brewer is timing out, similar or like controller cards for the other connected brewers may operate to prevent, based upon power status information provided thereto regarding the power draw status of the primary brewer, the application of power to such other connected brewers, allowing the primary brewer to draw high current without tripping the circuit breaker for the circuit to which the brewers are all connected.

Once the heat timer for the primary brewer has timed out, the controller card for such primary brewer will then start the wait timer associated with such primary brewer to provide opportunities, before the primary brewer is again permitted to draw high current, for the other connected brewers to engage in high current draws, such as by staggered or staged operations thereof, or based upon some alternative form of arbitration technique, as will be further discussed hereinafter, without conflict from the primary brewer during the duration of the wait time.

Those skilled in the art will recognize and understand that such energy management control can be advantageously effected through properly designed and configured circuitry on the controller card or, for example, by a testing loop as part of a programmed logic array or a programmed microprocessor. The design and/or programming thereof may be dependent in varying regards upon the particular brewers or other variable high current devices of interest and upon the particular arbitration decisions that a user may wish to adopt and employ.

In one embodiment of the present invention, the time out period of the heat timer is preferably selected to be greater than the maximum time period required for water heating by the primary brewer upon activation of such brewer, and the period of the wait timer is preferably selected to be a time sufficient to allow the other connected brewers to be able to cycle through high power portions of their operational cycles in some form of an ordered arrangement without conflict from the primary brewer. Such times may be able to be set or reset to selectable times by users, such as depending upon how many brewers are commonly connected to the circuit, with the wait time period being settable to a lower value if only two brewers are commonly connected and to a higher value if four brewers are commonly connected.

While separate controller cards may preferably be associated with each brewer commonly connected to the electrical circuit, a construction or control device that performs the functions of the separate controller cards can also, alternatively, be employed, especially if multiple brewers are to be connected to the circuit at a given location or in close proximity. In such event, the functions of several separate cards can be incorporated into a single control box, which may have separate output connections for controlling and/or powering separate brewers and their respective brewer control boards. Especially with such a construction there may be less need for wireless communication, and, if testing loops are employed as parts of such constructions, they may be so designed and configured to incorporate into a more comprehensive and unified testing loop the power statuses of all of the brewers controlled through such control construction.

Regardless of the particular control configuration utilized, the energy management controller or system of the present invention controls high current draws by the controlled plurality of brewers commonly connected to the same electrical circuit in order to avoid the tripping of the circuit's circuit breaker by providing for staged operation of the high current draw portions of such brewers.

BRIEF DESCRIPTION OF THE DRAWINGS

In referring to the drawings,

FIG. 4 is a status control chart for controller card A of FIG. 2 indicating the particular commonly connected brewer that will be enabled for high current draws under particular conditions;

DESCRIPTION OF THE PREFERRED EMBODIMENT

Figure 1:
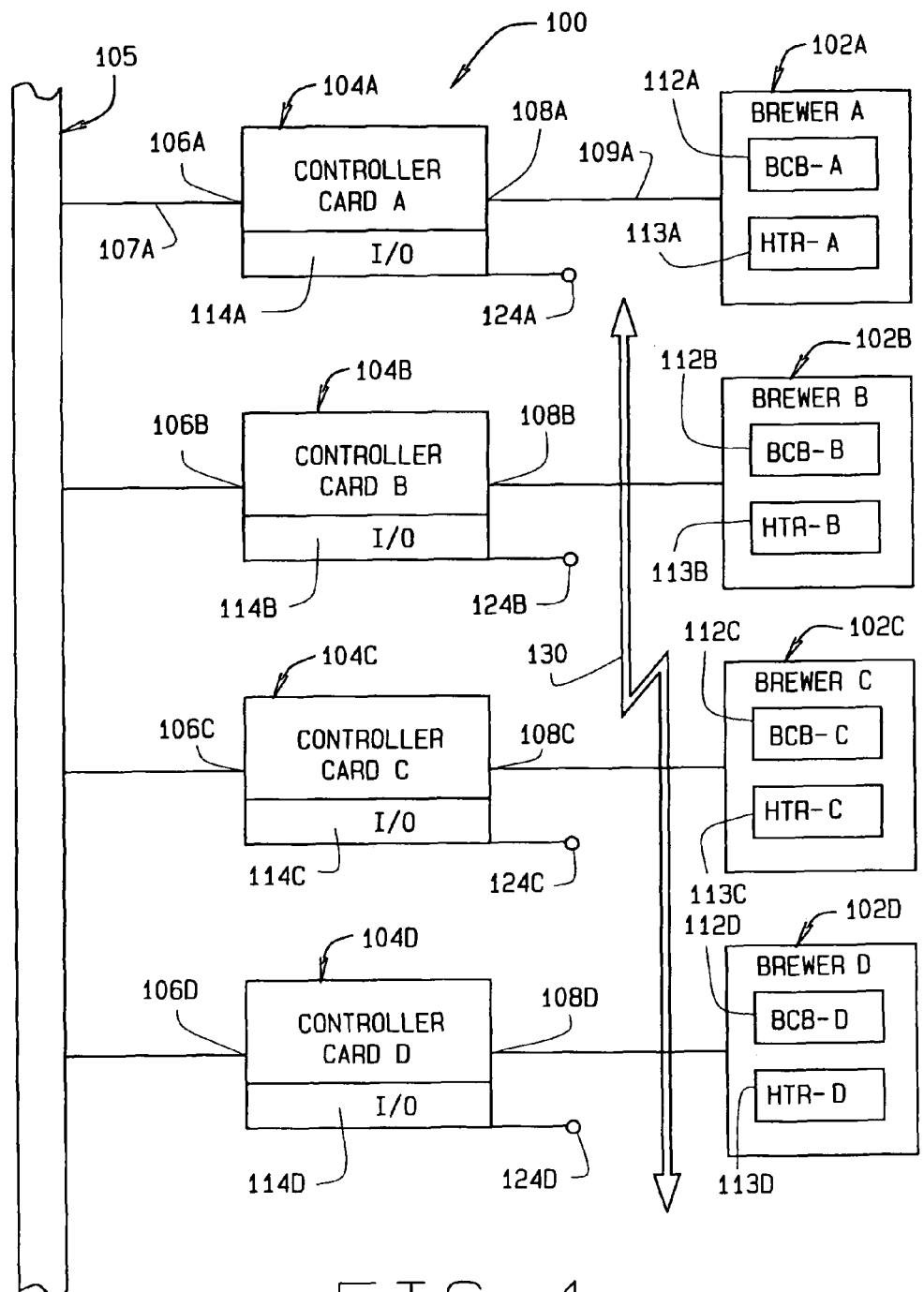
FIG. 1 is a stylized drawing depicting one form of the present invention in which separate energy management controller cards A-D are employed for respective single serve brewers A-D, with such controller cards A-D each interposed in circuit between an electrical circuit and a respective one of the four single serve brewers A-D to control the provision of high power thereto.

Referring now to the drawings wherein like numbers refer to generally like or similar items, FIG. 1 depicts a system 100 for controlling high power draws by four single serve brewers 102A-102D connectable through respective energy management controller cards 104A-104D, hereinafter generally referred to as EMS brewer controller cards or more simply as controller cards, to an exemplary given circuit 105. The individual brewers 102A-102D include respective brewer control boards BCB-A through BCB-D, identified by reference numbers 112A-112D, and respective heater constructions HTR-A through HTR-D, identified by reference numbers 113A-D. The controller cards 104A-D have respective input connections 106A-D and respective output connections 108A-D, and are operable, as will be further described hereinafter, to controllably gate the inputs received at input connections 106A-D to output connections 108A-D under certain conditions. In accordance with FIG. 1, controller cards 104A-D operate to controllably provide high power to the brewers 102A-D to operate their heater constructions 113A-D at certain times.

To effect such controllable provision of high power to the heater constructions 113A-D, the controller cards 104A-104D also include respective device information portions, such as input/output (I/O) portions 114A-114D with respective I/O connections 124A-124D, at which power status information regarding several of the commonly connected brewers is made available. The information at I/O connections 124A-124D is shared amongst controller cards 104A-104D through an interconnection 130, presented in FIG. 1 as a wireless networked communication bus.

For convenience of reference and further description hereinafter, wherein brewer 102I, and its associated controller card 104A are addressed in greater detail as representative of other brewers and EMS brewer controller cards therefore, brewer 102A will generally be referred to as the primary brewer, especially when associated with controller card 104A, and controller card 104A will therefore sometimes be referred to as the primary controller card. It should be recognized and understood, however, that such terminology is adopted here only for convenience of further description and that any of the other brewers 102B-102D can similarly be considered to be the primary brewer with regard to its respective, associated controller card 104B-104D.

Figures 2, 3:
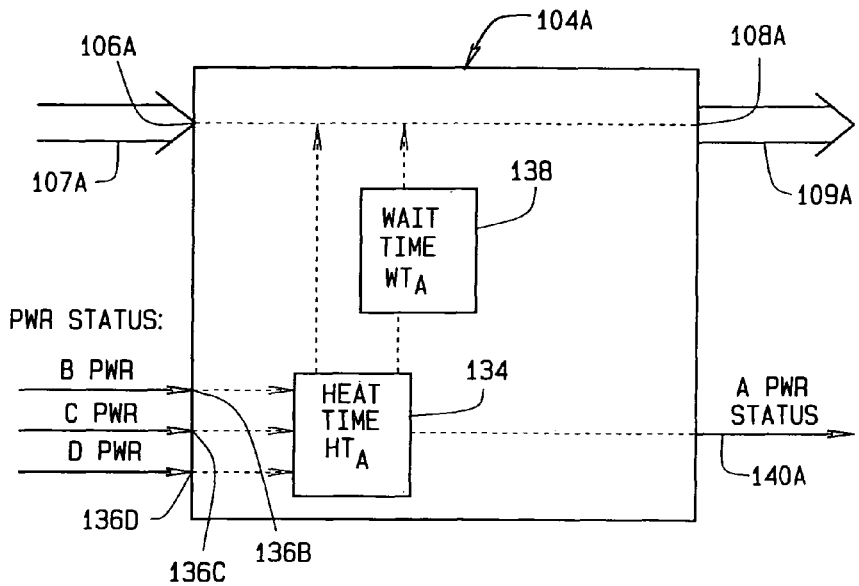
FIG. 2 is a drawing depicting in a diagrammatic form an energy management controller card A for brewer A of FIG. 1 diagrammatically illustrating that, in one preferred configuration, the control of power to brewer A by energy management controller card A is based upon a heat time function $HT_A$ associated with brewer A at energy management controller card A and a wait time function $WT_A$ at energy management controller card A, that the heat time function $HT_A$ is influenced by power status inputs from energy management controller cards B-D reporting power status information regarding brewers B-D, and that power status information regarding brewer A is based upon the heat time function $HT_A$ at energy management controller card A.
FIG. 3 is a state diagram that may be utilized for designing a controller card such as controller card A of FIG. 2 with circuitry that controls under what conditions brewer A primarily associated with that controller card will be permitted to draw high power, and what power usage information will be provided by such controller card A to other like controller cards associated with other commonly connected brewers on the same electrical circuit.

In one embodiment of the invention in accordance with FIG. 1, the controller cards 104A-104D control the provision of high power to their associated respective brewers 102A-102D based upon a heat time function $HT_A$ and a wait time function $WT_A$, as may be seen from FIG. 2. FIG. 2 diagrammatically depicts controller card 104A as having an associated heat time function $HT_A$ 134 that is conditioned or influenced by information reporting the power usage status of brewers B-D that is received by the I/O portion 114A, which information is labeled in FIG. 2 as B PWR, C PWR, and D PWR at I/O input connections 136B-D, and an associated wait time function $WT_A$ 138. Provision of high power, and high current, from circuit 105 of FIG. 1 to brewer 102A of FIG. 1 is based upon the heat time function $HT_A$ 134 and the wait time function $WT_A$ 138, and power status information reporting on the power usage status of brewer 102A is provided at I/O output connection 140A for communication to controller cards 106B-D. In such embodiment, I/O input connections 136B-136D and I/O output connector 140A comprise the I/O connection 124A of FIG. 1 at which information is shared over interconnection 130.

Typically, all of the separate controller cards will be of generally like construction, as a consequence of which controller cards 104B-D will generally have similar constructions to controller card 104A, but with commensurate changes in the information at the I/O input and output connections such that, for a given controller card and its associated brewer, power usage status information for such associated brewer is provided at the I/O output connection and power usage status information regarding the three other brewers commonly connected in the circuit is received at the I/O input connections.

With reference again to FIG. 2, control of power to primary brewer 102A, based upon heat time function $HT_A$ 134 and wait time function $WT_A$ 138, can be affected through properly designed and configured circuitry on the controller card 104A or by a testing loop as part of a programmed logic array or a programmed microprocessor.

In a somewhat simplified configuration, the heat time function $HT_A$ 134 may make use of a heat timer and the wait time function $WT_A$ 138 may Make use of a wait timer, both of which may take various well-known forms or be affected in various well known manners.

In accordance therewith, circuitry may be so configured on primary controller card 104A to monitor the states of a wait timer $WT_A$ 138 and a heat timer $HT_A$ 134, both associated with such primary brewer 102A, as well as the power usage status information, sometimes hereinafter referred to more simply as the power status information, at I/O inputs 136B-136D regarding the power usage of other commonly, connected brewers 102B-102D and to effect appropriate actions based upon such monitored data. Such circuitry may be so configured to allow application of power from power circuit output connection 108A to power circuit lead 109A of FIG. 1, and so to primary brewer 102A and its brewer control board BCB-A 112A, only under certain conditions and to provide power status information indicative of the power usage status of primary brewer 102A at I/O output connection 140A.

Inasmuch as single serve brewers require minimal power except when for the times when they are drawing power to heat the water, and can often draw close to the maximum power allowed through the circuit breaker of a typical circuit when the heater is operating, it has been found convenient in the design and construction of various preferred embodiments of the present invention to consider and to treat the power draw of a brewer as being 100% when water is being heated and 0% at other times, as a consequence of which, for simplification of further description, any brewer will hereinafter be considered as having 100% power usage whenever the heat timer of the associated controller card is active and timing out and 0% power usage at other times.

With such convention in mind, FIG. 3 is a state diagram such as might be utilized in configuring circuitry to effect desired results insofar as permitting or preventing power connection and provision of power status information for the primary brewer it the I/O output connection for the controller card. As may be observed, it is desired that power connection for primary brewer 102A be permitted only when the other commonly connected brewers are at 0% power usage, the wait timer $WT_A$ has timed out and is in an expired state, and the heat timer $HT_A$ is activated and in the process of timing out. Under such conditions, the A PWR usage status at I/O output connection 140A will be set to 100%. Under all other conditions, such a power connection is preferably to be disallowed with the A PWR usage status at I/O output connection 140A being set to 0%.

FIG. 4 is then a state diagram illustrating, for a system that has four (4) brewers 102A-102D commonly connected to a single electrical circuit with each of the brewers having a respective, associated controller card 104A-104D, various states of operation that may be encountered by controller card 104A and identifying the particular brewers enabled for the different states. As may be observed from consideration of FIG. 4 in conjunction with FIG. 3, in moving from state S0 through state S5 the brewers 102A-102D are, essentially, sequentially permitted to draw high power from the electrical circuit to which they are all commonly connected under control of their respective, associated controller cards 104A-104D.

With further reference to FIGS. 2-4, under the condition where a wait timer $WT_A$ 138 associated with primary brewer 102A has previously expired and no heat timers associated with other connected brewers are actively timing out, as at state S0, indicating that all of the associated brewers are at a minimal, here considered 0%, power usage status, primary controller card 104A will, as at state S1, activate the heat timer $HT_A$ 134 and allow a power connection of primary brewer 102A to circuit 105 of FIG. 1, set the power usage status information A PWR of primary brewer 102A, as provided at I/O output connection 140A, to 100%, and communicate such power status information about primary brewer 102A to the controller cards 104B-104D for the other connected brewers 102B-102D.

Thereafter, when heat timer $HT_A$ 134 times out, as at state S2, power connection of primary brewer 102A is then disallowed, the power usage status information A PWR of primary brewer 102A is set to 0%, and wait timer $WT_A$ 138 is activated and begins to time out. As wait timer $WT_A$ 138 continues to time out, controller cards 104B-104D will operate in similar fashion to controller card 104A as at state S0 to allow power connection of their respective, associated primary brewers 102B-102D, as represented by states S3-S5 of FIGS. 3-4. For each of states corresponding to S3-S5, the controller cards 104B-104D will operate to set one of the B PWR, C PWR, and D PWR power usage status information signals to 100% and to permit and effect power connection to the brewer primarily associated with the appropriate one of such controller cards while the others of such power usage status information signals are set to 0% with power connection to the brewers primarily associated with the others of such controller cards being disallowed.

In order to best effect such operation, the heat time period is preferably selected to be of a sufficient duration for water to be heated by the associated brewer and the wait time period is preferably selected to be of a sufficient duration to ensure that the associated brewer will remain unenabled while the other commonly connected brewers are permitted to be enabled in some desired order or other arrangement, oftentimes on a sequential basis.

Figure 5:
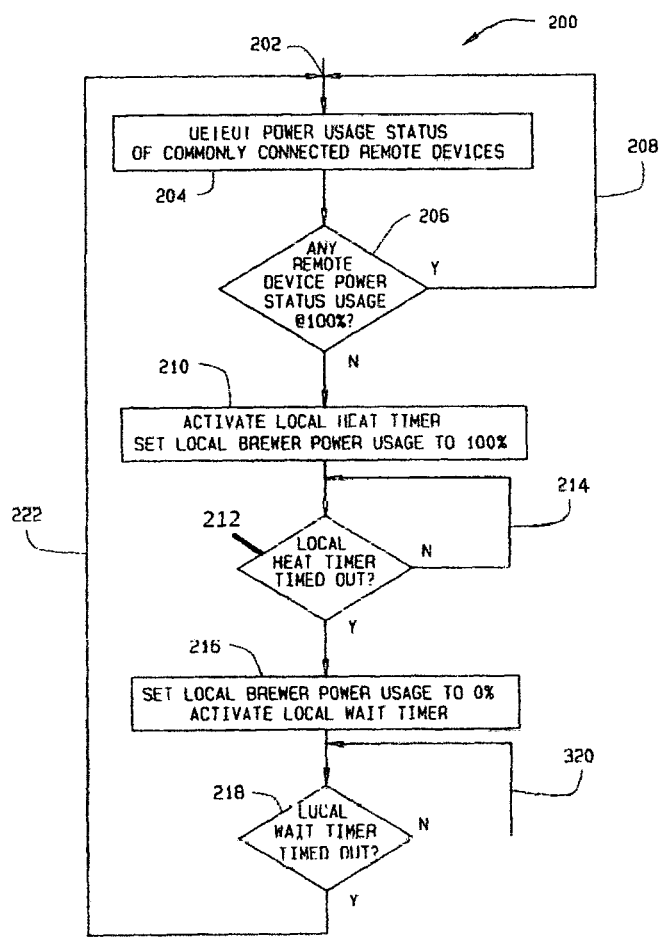
FIG. 5 is a simplified testing loop such as may be employed with an alternative embodiment according to the present invention.

As has been previously noted, alternative embodiments of controller cards that include programmed logic arrays or programmed microprocessors may employ testing loops instead of and/or in association with configured circuitry to similar effect. In such regard, FIG. 5 depicts a simplified testing loop of a type such as might be employed to effect desired results.

For purposes of discussion, when heat timer $HT_A$ 134 and wait timer $WT_A$ 138 are both timed out, the testing loop 200 may be considered to have an entry point 202 following which, at block 204, detection of power usage status of commonly connected remote devices occurs and a check is thereafter made at decision block 206 to determine whether any remote device power status is at 100%.

If so, the system is considered to be operating as at states corresponding to states S3-S5 and controller card 104A will continue in a loop through point 202, block 204, block 206, and loop connection 208 until, at block 206, no remote device power status usage is detected to be at 100%.

If no remote device power status usage is at 100% at block 206, corresponding generally to state S0, the testing loop will proceed from block 206 to block 210, at which stage the heat timer $HT_A$ 134 will be activated and the A PWR status associated with primary brewer 102A will be set to 100% by controller card 104A, before thereafter proceeding to decision block 212, at which a check will be made to determine whether heat timer $HT_A$ 134 has finished timing out.

If the heat timer $HT_A$ 134 has not timed out, the controller card 104A will continue in a loop through block 212 and loop connection 214, corresponding generally to state S1, until heat timer $HT_A$ 134 successfully times out.

Following the timing out of heat timer $HT_A$ 134, the testing loop will proceed from decision block 212 to block 216, at which stage the A PWR status usage will be set to 0% and the wait timer $WT_A$ 138 will be activated to begin to time out, before thereafter proceeding to decision block 218, at which a check will be made to determine whether wait timer $WT_A$ 138 has finished timing out.

If the wait timer $WT_A$ 138 has not timed out, the controller card 104A will continue in a loop through block 218 and loop connection 320, corresponding generally to state S2, until wait timer $WT_A$ 138 successfully times out.

When the wait timer $WT_A$ 138 then successfully times out, the testing loop will loop back from block 218 to entry point 202 as via loop connection 222.

Those skilled in the art will recognize and understand that the simplified testing loop is but one of a number of testing loop variations that may be utilized to effect the desired results, that various of the decision blocks may be reconfigured or re-ordered in various ways, and that other functions and operations may be added and included within the testing loop. In such regard, especially with systems that employ wireless networks for the sharing of power usage status information between and among controller cards, one or more operation blocks may be incorporated such that the controller card for the associated primary brewer will transmit current power usage status information regarding the primary brewer over the wireless network and information regarding the power usage status of other commonly connected brewers will be timely received and read by the controller card.

Although the foregoing discussions have primarily addressed constructions and systems in which one single serve brewer draws such high power during a portion of its operation that it is not feasible to permit additional brewers to also draw high power at the same time, situations may exist or develop, including through efficiencies achieved in the power required for operation of brewers, that it nay be feasible to permit two or more devices, but still less than all commonly connected devices, to draw significant amounts of power at the same time. In such events, controller cards for individual devices can, consistent with the present invention, be designed and constructed to control and permit such operations.

Additionally, as has already been briefly addressed hereinabove, in some situations or for some systems, such as when multiple devices are to be utilized next to or in close proximity to one another, it may be advantageous to incorporate the functions of several separate controller cards into one system construction to which multiple of the devices could be connected for control thereby.

It should also be understood and appreciated that controller constructions according to the present invention may also rely upon additional inputs and other information in determining whether and when to permit a power connection of the primary device to the electrical circuit. By way of example only, and not of limitation, the high power determination portion may, in addition to power status information inputs regarding other remote devices, also be connected or configured to receive information from the primary device or its control board indicating that an actual request or demand for high power has occurred at the primary brewer. In such a situation, a power connection may have been permitted for low power draw by the primary device, but the initiation of a heat timer may be delayed until such time as the actual request or demand for high power occurs while the remote devices are also in low power draw states and the wait timer is in an expired state. In such a situation, depending upon other design features and considerations, the power connection permitting low power draws by the primary device may be broken in the event that the power status information for any of the remote devices changes from 0% to 100%. Such modifications, however, remain consistent with the present invention as disclosed and discussed hereinbefore.

While the form of the invention as discussed hereinabove can operate to effect the control desired, the interposition of the controller boards within the power circuitry between the common electrical circuit and the brewers results in the inclusion of such controller boards, or portions thereof, within the high current circuits, which can raise issues relating to whether and how low current power may appropriately be provided to the brewers at other times, as well as safety concerns, especially in regards to design and approval of products. Various approaches can be employed to address or alleviate such concerns, such as the utilization of rechargeable power sources within the brewers or the use of separate low power circuits for maintenance or other low current operations, or, especially to address safety or approval concerns, the use of a different form of the invention, as will be hereinafter described.

Figure 6:
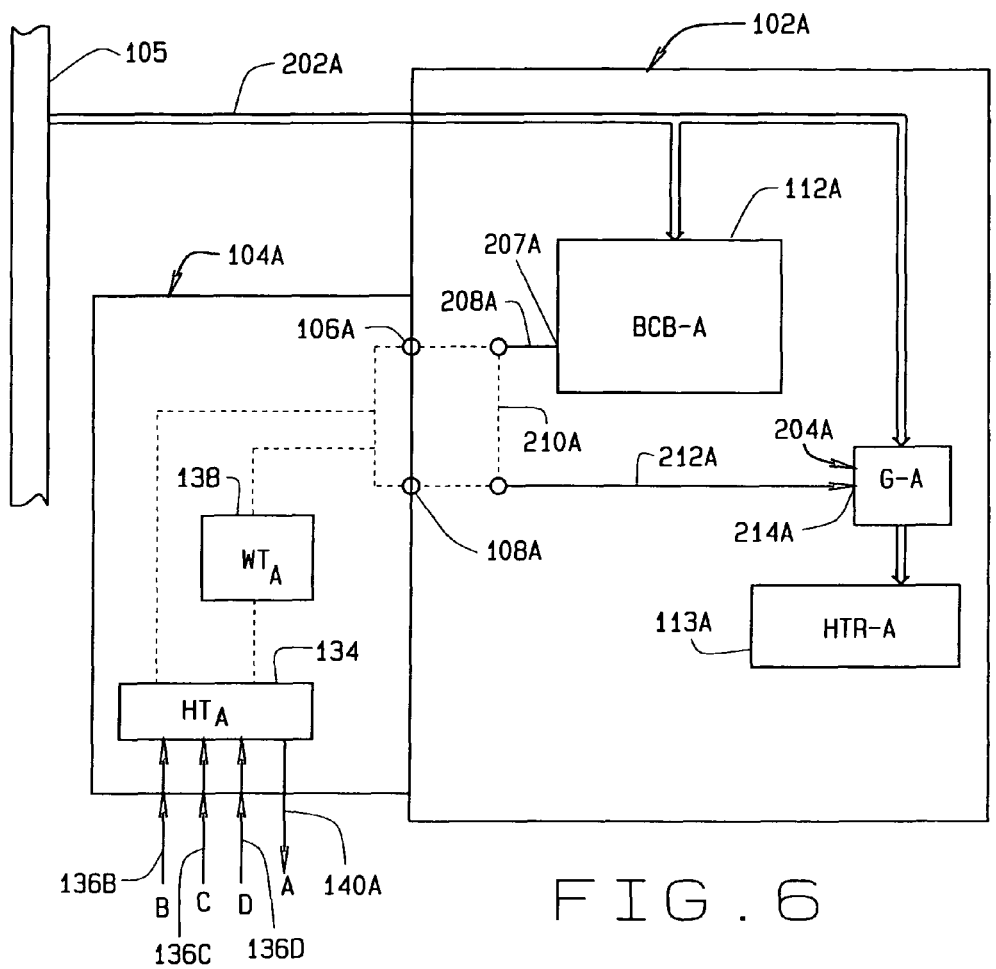
FIG. 6 is a drawing depicting another form of the invention wherein a controller card is installed in circuit with the gating control portion of a high power gating construction of a brewer and controllably gates a control signal received at an input connection of the controller card to an output connection thereof so as to control the provision of high current to the heater construction of the brewer.
Figure 7:
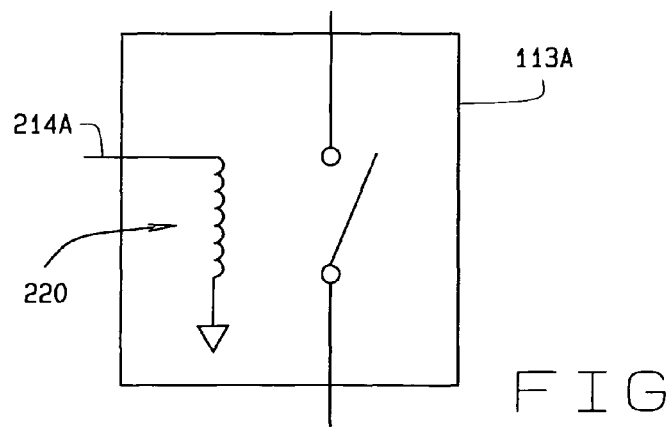
FIG. 7 depicts a relay construction of the type that may typically be employed in the high power gating construction of a brewer.

Many current brewers are designed in such a way that they include a control board that draws low current and that operates at low power, a heater construction that requires a large current and draws high power when it is operating, and a high power gating construction for gating, under certain conditions, such as when heating of stored water is required to effect a desired brewing temperature, high current to the heater construction in response to a gating signal produced by the brewer control board. A brewer of such type may be depicted generally as shown in FIG. 6, wherein the brewer 102A is connected to an electrical circuit 105 via a power connection 202A. Gating construction G-A 204A is connected in circuit between power connection 202A and HTR-A 113A of the brewer and operates under control of a gating signal produced by BCB-A 112A at output 207A and provided over leads 208A, 210A, and 212A to gating signal input 214A of gating construction G-A 204A. Typically, gating construction G-A 204A may take the form of a relay construction 220, such as is shown in FIG. 7, although various other types of well known gating controls could also be advantageously employed.

Figure 8:
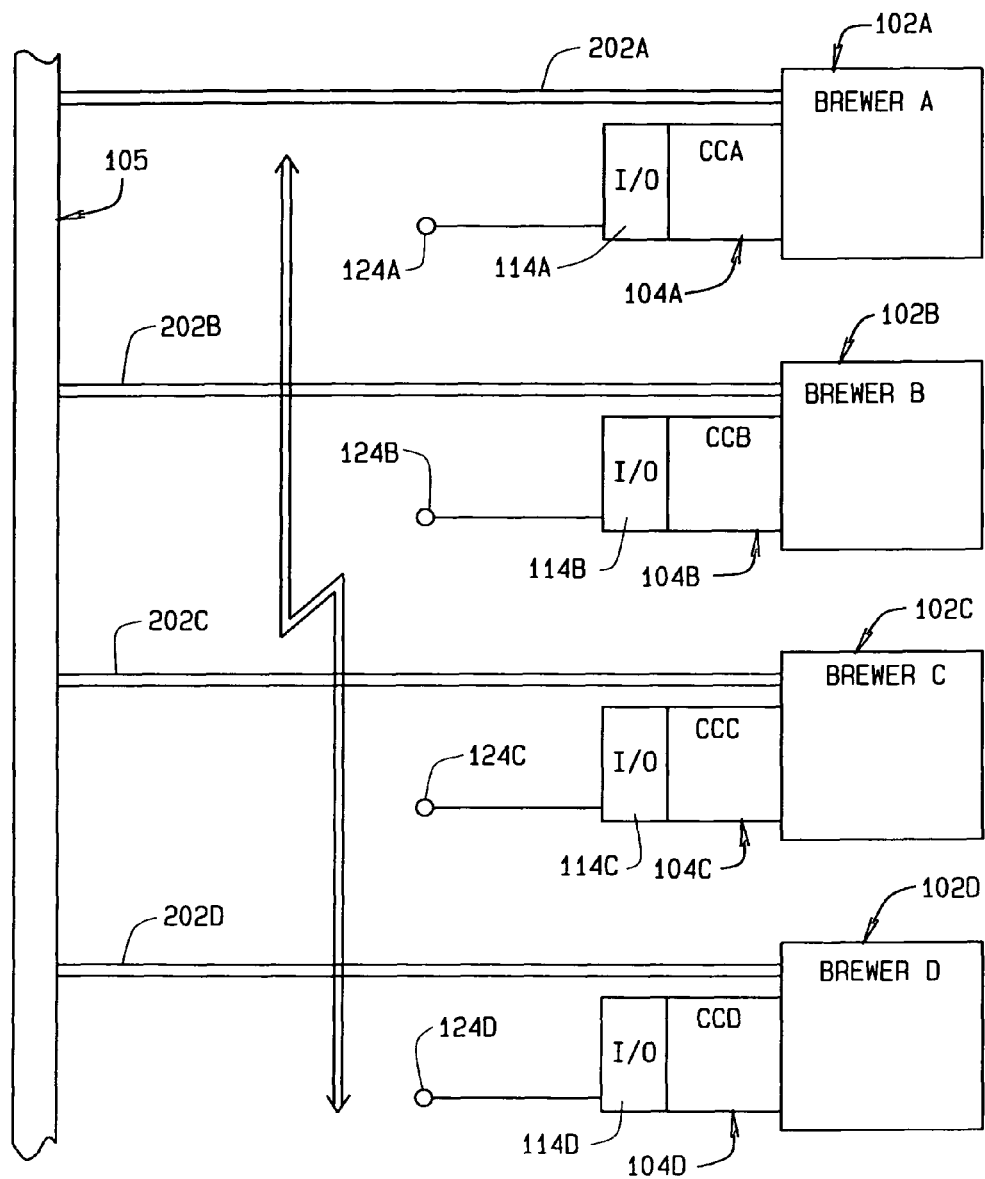
FIG. 8 is a drawing depicting one manner in which the form of the invention of FIG. 6 may be employed with four commonly connected brewers.

In the currently preferred form of the invention for use with such types of brewers, a controller board 104A, having a design generally like the design of FIG. 2, is connected in the gating control circuit associated with brewer A between BCB-A output 207A and gating construction input 214A in place of lead 210A, as shown in FIG. 6, and similar controller boards 104B, 104C, and 104D may be connected in the gating control circuits associated with brewers B-D, as shown in FIG. 8, with brewers A-D 102A-D connected to a common circuit 105 through respective power leads 202A through 202D.

In such form of the invention, the controller cards 104A through 104D operate in similar fashion to that described hereinabove relative to FIG. 2 to controllably gate the inputs at input connections 106A-D of such controller cards to output connections 108A-D of such controller cards under certain conditions to effect performance generally in accord with the discussion associated with FIGS. 3-5.

It should be appreciated and understood that, in the preceding embodiment, as opposed to the invention embodiment of FIG. 1, controller cards 104A-D operate to controllably gate control signals, typically at low power, from input connections 106A-D to output connections 108A-D, instead of controllably gating power from input connections 106A-D to output connections 108A-D, as in FIG. 1. While such distinction may be significant in terms of safety considerations and ease of securing approvals from bodies such as Underwriters Laboratory (UL), it is not necessarily significant in terms of the requisite operation by the controller cards 104A-D as part of the present invention. The forms of FIG. 1 and FIG. 8 are but two alternative forms of the present invention that may both be advantageously employed to affect the desired results.

Figure 9:
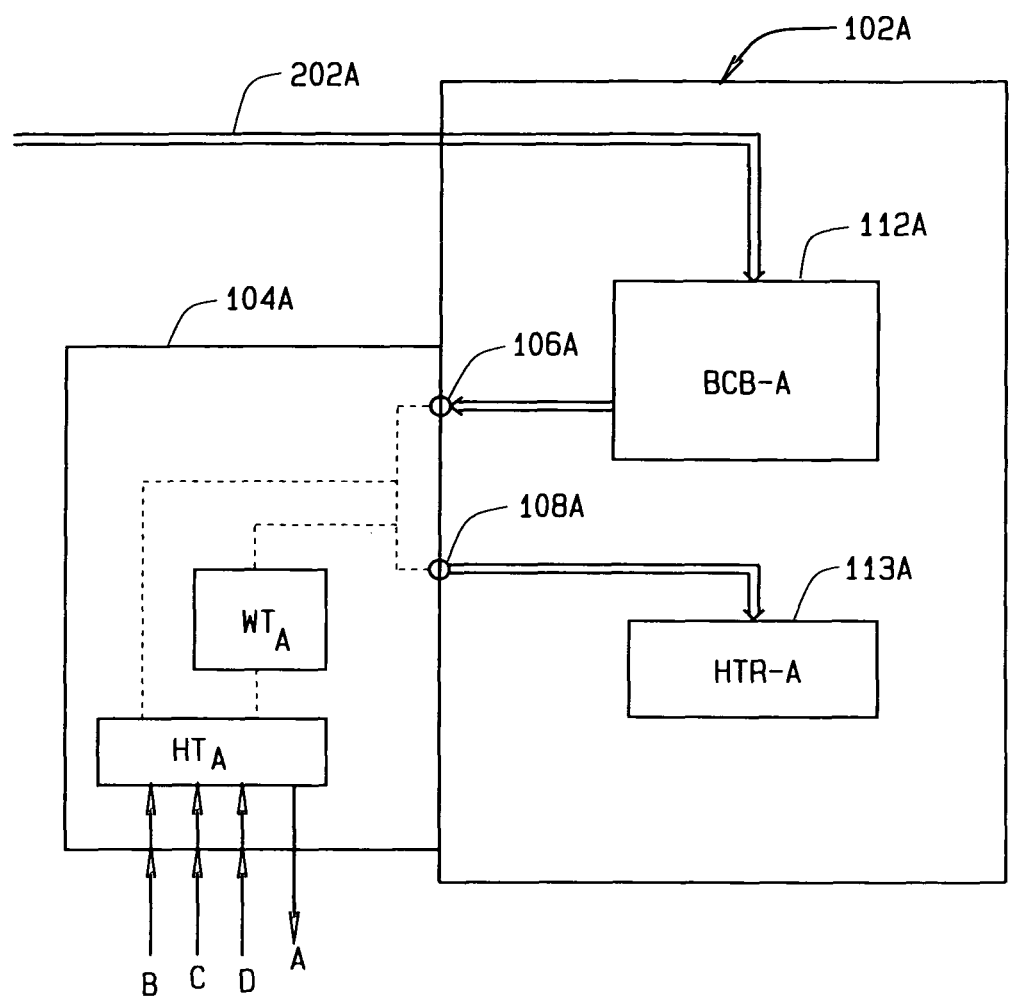
FIG. 9 is a drawing depicting another form of the invention, similar in some respects to that shown n FIG. 6, but wherein the controller card is controllably gating high power from the brewer as received at the input connection of the controller card to the output connection of such controller card for communication to the heater construction of the brewer.

Moreover, it will be understood and appreciated by those skilled in the art that several other variations in general accord with the form of the invention depicted in FIG. 8 can be readily realized, including variations in which, if the user does not consider it important to maintain the controller card portion of the brewer/controller card configuration as a low power portion separate from the high power circuitry, the gating function of gating control G-A can be incorporated within the design and operation of the controller card and/or the brewer control board may be designed and operate similarly to what has been described hereinabove in association with the form of FIGS. 1-2 to control the flow of high power therethrough. FIG. 9 is generally representative of such types of variations, with input connection 106A being a power input at controller board 104A and output connection 108A being a power connection for providing power from the controller card 104A to the heater construction HTR-A 206A of brewer A 102A.

As should also be clearly understood and appreciated, in the foregoing discussions operation of the controller card has been described primarily in terms of a heat timing function and a wait timing function, which functions form part of an arbitration function of the controller card. While the heat timing and wait timing functions described are certainly representative of types of functions that may be incorporated within the arbitration function, it should be clearly understood that the controller card may also incorporate or include other and more complex formulations and operations for determining which high current operation may be allowed at any given point in time and/or when any particular high current operation may be allowed. For example, a controller card may be so configured that the arbitration function thereof may, in the event that, at any given point in time, multiple commonly connected brewers are requesting high current, determine the order in which high current will thereafter be authorized for each of such multiple brewers. In accordance with one simple arbitration function, priority may be assigned based upon the device serial number. Alternatively, priority may be granted to a brewer that dispenses higher valued drinks over a brewer that dispenses lower valued drinks, or to a brewer that is more efficient in effecting desired heating over a less efficient brewer.

Typically, in the foregoing embodiments, once the heater for a given brewer has been granted priority and has thereafter operated sufficiently, time will then be afforded, in accordance with the wait timing function, for operation of the heaters of the other commonly connected brewers before operation of the heater of such given brewer is again authorized. It should be recognized and understood, however, that such cycling need not necessarily be adopted or employed as part of the arbitration function, and that any suitable arbitration scheme or procedure convenient to the users may be employed, regardless of whether or not cycling through all brewers is permitted or effected.

In accordance therewith, the time durations permitted for high current draws may also be varied or limited, and different timings may be associated with different of the commonly connected brewers. By way of example, and not of limitation, for one preferred embodiment the settings of a pair of switches 230, 232 on the controller card, as set forth in FIG. 10, may control, in 30 second increments, ranging from 30 seconds to 120 seconds, the time duration during which high current may be drawn by the given primary brewer when multiple controller cards are active. Different time increments can be easily established and employed, and various constructions and techniques can be readily employed to establish and apply the particular time increments adopted, including look-up tables of various types, such as look-up tables associated with microchips or microprocessors associated with the controller cards.

Figure 10:
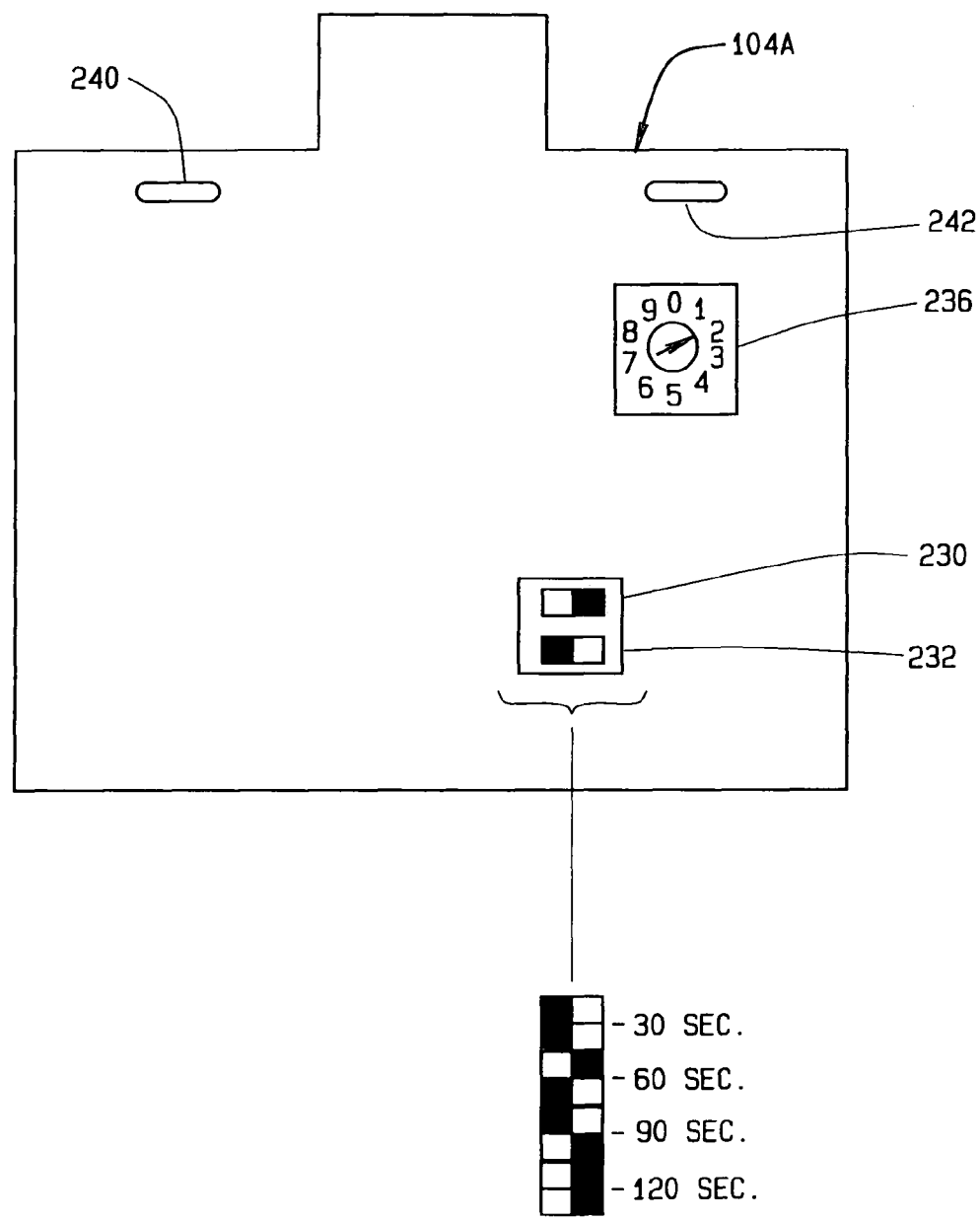
FIG. 10 is a drawing depicting a controller card that includes thereon a channel selector for selecting desired communication channels for networked communication, timing selection switches operable for selection of desired time durations, and LEDs for the visual display and communication of certain desired information.

In addition, since certain environments may be such that a number of brewers are connected to multiple different circuits, with different groupings of brewers on different common circuits, it has been found advisable and beneficial to include channel selection controls on the separate controller cards in order to allow the controller cards connected on a common circuit to effectively communicate via the selected channel with other controller cards connected on that same common circuit and without interfering with controller cards connected to different circuits, which should preferably be set to a different channel selection. At the present time, such channel selection can typically be adequately addressed through the use of a ten position rotary switch 236 on the controller card, such as is shown in FIG. 10, with those controller cards commonly connected on the same circuit all set to the same channel, although various other constructions and techniques can also be employed to establish and associate with a given controller card communication protocols, including channel selection for network communications.

It has also been found desirable in some instances and with some embodiments for a user to be able to visually view certain status information relative to the controller cards and the environments in which they are employed. Such information can be readily provided via indicator lights or displays of various types. By way of example and not of limitation, in one more basic system the indicator lights may take the form of a pair of bi-color LEDs 240, 242 installed on the controller card, as in FIG. 10, to indicate the status of the board. Typically, such LEDs are operational when the board is powered during a call for heat by the primary brewer, with one LED blinking to indicate the number of active devices detected on the network calling for heat and with the other LED indicating the status of the heater for the primary brewer associated with the controller card. If such LED is green, the primary brewer is in standby mode, and not using high power to heat. If the LED is red, the primary brewer is utilizing high power to operate the heater. Various and sundry other well known visual indicators, including, for example, display screens responsive to microprocessor outputs, could also be readily employed, either on the controller card or associated with the primary brewer.

In light of all the foregoing, it should thus be apparent to those skilled in the art that there has been shown and described an energy management system and method for controlling the application of power to one or more variable power devices that are commonly connected to a electrical circuit and which are operable to individually draw high power from such circuit during a portion of their operational cycle. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

We claim:

1. An energy management control system for controlling and limiting the time during which high current is drawn by at least a high current circuit of a defined primary device from among a plurality of devices commonly connectable to the same electrical circuit for drawing high current therefrom, wherein at least the defined primary device has an operating cycle during a portion of which it draws high current for operation, comprising:

a controller electrically connectable to the primary device to complete a circuit for controlling the provision of high current from the electrical circuit to the high current circuit of the primary device, said controller construction including;

a first circuit for receiving power usage status information from each of the other devices devices commonly connected to the same electrical circuit, the power usage status information is defined to be representative of a high power usage state for a given device of the other devices or a lower power usage state for a given device of the other devices;

said first circuit operable to determine in accordance with said power usage status information and predefined timing criteria whether to disallow or permit the provision of high current to the high current portion of the primary device under then-existing conditions;

said first circuit disallowing the provision of high current at least during periods when the power usage status information regarding the other devices indicates that authorization of high current for the high current circuit of the primary device at that time would result in a total high current draw deemed impermissible for the electrical circuit;

said first circuit permitting the provision of high current when the supplied power usage status information regarding the other devices indicates that authorization of high current for the high current portion of the primary device at that time would result in a total high current draw deemed within permissible parameters for the electrical circuit and is allowable in accordance with said predefined timing criteria;

a second circuit operable to determine in accordance with predefined timing criteria whether to disallow or permit the provision of high current to the high current circuit of the primary device under then-existing conditions;

an output control circuit responsive to a disallowance determination by said first circuit or said second circuit to inhibit the provision of high current between the electrical circuit and the high current circuit of the primary device and responsive to a permission determination by said first circuit or said second circuit to effect the provision of a high current to the high current circuit of the primary device to the electrical circuit; and said controller further including an output at which power status information representative of the power status of the primary device is provided to the other devices.

2. The energy management control system of claim 1 wherein said controller is interposable in circuit between the electrical circuit and the primary device and is operable to controllably gate the provision of high current therethrough.

3. The energy management control system of claim 1 wherein the electrical circuit is connected to the primary device and said controller is so interposable in circuitry of the primary device to controllably effect the provision of high current to the high current circuit of the primary device.

4. The energy management control system of claim 3 wherein said controller is so connected in circuitry and operable to controllably gate high current provided to the primary device to the high current circuit of the primary device.

5. The energy management control system of claim 3 wherein:
the primary device includes a control circuit and a gating circuit responsive to the control circuit for gating high current to the high current circuit of the primary device, with the control circuit producing a gating control signal to be provided to the gating circuit to effect the provision within the primary device of high current to the high current circuit thereof; and
said controller is interposable in circuit between the control circuit and the gating circuit of the primary device to controllably gate the gating control signal therethrough to effect the provision of high current to the high current circuit of the primary device.

6. The energy management control system of claim 1 wherein each of the other devices includes a controller.

7. The energy management control system of claim 6 including a network for communicating among the controllers power status information of each of the other devices.

8. The energy management control system of claim 7 wherein said network is a wireless network.

9. The energy management control system of claim 8 wherein said controllers each include channel selection devices for selectively establishing a communications channel for the communication of the power status information.

10. The energy management control system of claim 1 wherein the primary device and the other devices are brewers and the high current circuit of the primary device is a heater.

11. The energy management control system of claim 1 wherein:
said second circuit includes;
a wait timing circuit associated with the primary device having activated and expired phases of operation, said wait timing circuit establishing during said activated phase of operation a wait time period to provide an opportunity for the other devices to engage in high current usage without conflict from the primary device, at least a portion of the activated phase of operation of said wait timing circuit occurring outside of the period of high current usage by the primary device; and
an output determination circuit responsive to said wait timing circuit to disallow the provision of high current between the primary device and the electrical circuit while said wait timing circuit is in the expired phase of operation.

12. The energy management control system of claim 11 wherein:
said controller is a controller card;
said first circuit includes input connections at which said power usage status information regarding the other devices is received; and
a high current timer circuit with a high current timing period representative of the time period of high current usage by the primary device.

13. The energy management control system of claim 12 wherein said high current timing period is at least as great as the normal period of high current usage by the primary device.

14. The energy management control system of claim 12 wherein said wait time period is of a sufficient duration to ensure that the primary device will be in the expired phase of operation to provide the opportunity for the other devices to engage in high current usage.

15. The energy management control system of claim 14 wherein the wait time period is activated upon expiration of the high current timing period of the high current timer circuit.

16. The energy management control system of claim 15 wherein the output determination portion produces a power usage information signal signifying high current usage by the primary device during the high current timing period.

17. The energy management control system of claim 16 wherein:
each of the other devices commonly connected to the same electrical circuit have operating cycles during portions of which the other devices commonly connected to the same electrical circuit draw a high current for operation and during other portions of which the other devices commonly connected to the same electrical circuit draw a lower current for operation; and.

18. The energy management control system of claim 17 further including a network bus for sharing amongst the controllers the power usage information of the primary device and the other devices.

19. The energy management control system of claim 18 wherein the network bus is a hardwired connection.

20. The energy management control system of claim 18 wherein the network bus is a wireless connection.

21. The energy management control system of claim 11 wherein said second circuit includes circuitry configured to affect the control and limitation of the time during which high current draws may be made by the primary device.

22. The energy management control system of claim 11 wherein said second circuit includes a programmed logic array configured to affect the control and limitation of the time during which high current draws may be made by the primary device.

23. The energy management control system of claim 11 wherein said second circuit includes a processor programmed to affect the control and limitation of the time during which high current draws may be made by the primary device.

24. The energy management control system of claim 11 wherein:
each of the other devices commonly connectable to the electrical circuit have operating cycles during portions of which the other devices commonly connectable to the electrical circuit draw high current for operation and during other portions of which they draw a lower current for operation.

25. The energy management control system of claim 24 wherein said controllers operate to control and limit the time during which high current draws may be made by all of the primary and the other devices.

26. The energy management control system of claim 11 wherein said wait time period is settable by a user to a desired period.

27. The energy management control system of claim 11 wherein:
- each of the other devices commonly connectable to the electrical circuit have operating cycles during portions of which each of the other devices draw high current for operation and during other portions of which each of the other devices draw a lower current for operation; and
- said wait time period is established to be greater than the time for the commonly connected other devices to sequentially sequence through the high current draw portions of operation.

28. The energy management control system of claim 11 wherein the primary device is a single serve coffee brewer.

29. A method of controlling and limiting the time during which high current is drawn by at least a high current circuit of a defined primary device from among a plurality of devices commonly connectable to the same electrical circuit for drawing high current therefrom, wherein at least the defined primary device has an operating cycle during a portion of which it draws high current for operation, the primary device comprising
- a controller associated with and electrically connectable to the primary device to complete a circuit for controlling the provision of high current from the electrical circuit to the high current circuit of the primary device, said controller including:
- a device information circuit for receiving power usage status information that may be supplied thereto regarding the other devices, power usage status information is defined to be representative of a high current usage state for a given device of the other devices or representative of a lower current usage state for the other devices;
- a high current determination circuit associated with the primary device and indicating a period defined to be a period of high current usage by the such primary device; and
- a wait timer associated with the primary device having activated and expired phases of operation, said wait timer establishing during said activated phase of operation a wait time period to provide an opportunity for the other devices to engage in high current usage without conflict from the primary device, at least a portion of the activated phase of operation of said wait timer occurring outside of the period of high current usage by the primary device, the method comprising the steps of:
- monitoring the power usage status information supplied to said device information circuit regarding the other devices, the period of high current usage by the primary device, and the operation phases of said wait timer;
- responding to said power usage status information supplied regarding the other devices to disallow the provision of current between the high current circuit of the primary device and the electrical circuit during periods when the power status information regarding the other devices indicates that a given device of the other devices is then in a high current usage state;
- responding to said power usage status information supplied regarding the other devices and to said wait timer to permit and effect the provision of current between the high current portion of the primary device and the electrical circuit during periods when the supplied power usage status information regarding the other devices indicates that the other devices are then in low power usage states and said wait timer is in an expired phase of operation; and
- responding to said wait timer to disallow the provision of current between the high power portion of the primary device and the electrical circuit while said wait timer is in an activated phase of operation.

30. The method of claim 29 wherein:
- the other devices commonly connectable to the electrical circuit have operating cycles during portions of which the other devices draw a high current for operation;
- said controller is a controller card; and
- said energy management controller system further includes a controller card for each of the other devices.

* * * * *